(12) United States Patent
Chen (10) Patent No.: US 6,487,309 B1
(45) Date of Patent: Nov. 26, 2002

(54) INTERPOLATION PROCESSING APPARATUS AND RECORDING MEDIUM HAVING INTERPOLATION PROCESSING PROGRAM RECORDED THEREIN

(75) Inventor: Zhe-Hong Chen, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/313,656

(22) Filed: May 18, 1999

(30) Foreign Application Priority Data

May 19, 1998 (JP) .......................................... 10-136560

(51) Int. Cl.$^7$ .......................... G06K 9/00; G06K 9/32; G06K 9/34; H04N 1/46
(52) U.S. Cl. ....................... 382/162; 382/300; 382/164; 382/167; 358/501; 358/525
(58) Field of Search ................................ 382/162, 167, 382/300, 301; 348/207, 219, 220, 222, 342, 345, 349, 359; 358/501, 512, 515, 518–520, 530, 525

(56) References Cited

U.S. PATENT DOCUMENTS

| | | | | |
|---|---|---|---|---|
| 4,758,883 A | * | 7/1988 | Kawahara et al. | ............ 358/44 |
| 5,317,426 A | * | 5/1994 | Hoshino | ...................... 358/515 |
| 5,363,218 A | * | 11/1994 | Hoshino | ...................... 358/518 |
| 6,108,036 A | * | 8/2000 | Harada et al. | .............. 348/219 |

* cited by examiner

*Primary Examiner*—Phuoc Tran
*Assistant Examiner*—Amir Alavi
(74) *Attorney, Agent, or Firm*—Oliff & Berridge, PLC (57) ABSTRACT

An interpolation processing apparatus includes: an interpolation processing unit that performs interpolation processing on a color image expressed through a colorimetric system constituted of a predetermined plurality of color components to determine an interpolation quantity corresponding to a value representing a missing color component in each pixel; and a color composition identification unit that identifies a color component composition of the color image. And the interpolation processing unit is capable of performing a plurality of types of interpolation processing in correspondence to color component compositions of the color image, selects a type of interpolation processing corresponding to the color component composition identified by the color composition identification unit and performs the type of interpolation processing that has been selected on the color image.

20 Claims, 8 Drawing Sheets

| G | R | G | R | G | R | G | R | G | R | ... |
|---|---|---|---|---|---|---|---|---|---|---|
| B | G | B | G | B | G | B | G | B | G | ... |
| G | R | G | R | G | R | G | R | G | R | ... |
| B | G | B | G | B | G | B | G | B | G | ... |
| G | R | G | R | G | R | G | R | G | R | ... |
| B | G | B | G | B | G | B | G | B | G | ... |
| G | R | G | R | G | R | G | R | G | R | ... |
| B | G | B | G | B | G | B | G | B | G | ... |
| G | R | G | R | G | R | G | R | G | R | ... |

| G(0,0)=255 | R(0,1)=237 | G(0,2)=26 | R(0,3)=50 | G(0,4)=255 | R(0,5)=234 | G(0,6)=18 | R(0,7)=83 | ... |
|---|---|---|---|---|---|---|---|---|
| B(1,0)=255 | G(1,1)=251 | B(1,2)=28 | G(1,3)=37 | B(1,4)=255 | G(1,5)=241 | B(1,6)=19 | G(1,7)=80 | ... |
| G(2,0)=255 | R(2,1)=251 | G(2,2)=31 | R(2,3)=44 | G(2,4)=255 | R(2,5)=244 | G(2,6)=18 | R(2,7)=69 | ... |
| B(3,0)=255 | G(3,1)=253 | B(3,2)=34 | G(3,3)=34 | B(3,4)=255 | G(3,5)=241 | B(3,6)=19 | G(3,7)=60 | ... |
| G(4,0)=255 | R(4,1)=255 | G(4,2)=38 | R(4,3)=30 | G(4,4)=255 | R(4,5)=251 | G(4,6)=19 | R(4,7)=51 | ... |
| B(5,0)=255 | G(5,1)=255 | B(5,2)=34 | G(5,3)=23 | B(5,4)=255 | G(5,5)=253 | B(5,6)=21 | G(5,7)=54 | ... |
| G(6,0)=255 | R(6,1)=255 | G(6,2)=42 | R(6,3)=21 | G(6,4)=255 | R(6,5)=252 | G(6,6)=27 | R(6,7)=50 | ... |
| B(7,0)=255 | G(7,1)=254 | B(7,2)=32 | G(7,3)=23 | B(7,4)=255 | G(7,5)=247 | B(7,6)=21 | G(7,7)=52 | ... |
| ⋮ | ⋮ | ⋮ | ⋮ | ⋮ | ⋮ | ⋮ | ⋮ | ⋱ |

INTERPOLATION PROCESSING APPARATUS AND RECORDING MEDIUM HAVING INTERPOLATION PROCESSING PROGRAM RECORDED THEREIN

The disclosure of the following priority application is herein incorporated by reference:

Japanese Patent Application No. 10-136560 filed May 19, 1998.

BACKGROUND OF THE INVENTION

1. Field of the Invention

The present invention relates to an interpolation processing apparatus that performs interpolation processing in which the interpolation quantity corresponding to the value of a missing color component in each pixel is determined for a color image expressed through a colorimetric system comprising a predetermined plurality of color components and a recording medium having an interpolation processing program which enables a computer to execute such interpolation processing recorded therein.

2. Description of the Related Art

A color image is generated by capturing an image of a subject image that has been transmitted through a CFA (color filter array) constituted of color filters in a plurality of colors (e.g., RGB: red, green, blue) in an electronic still camera in the prior art.

Figure 7:
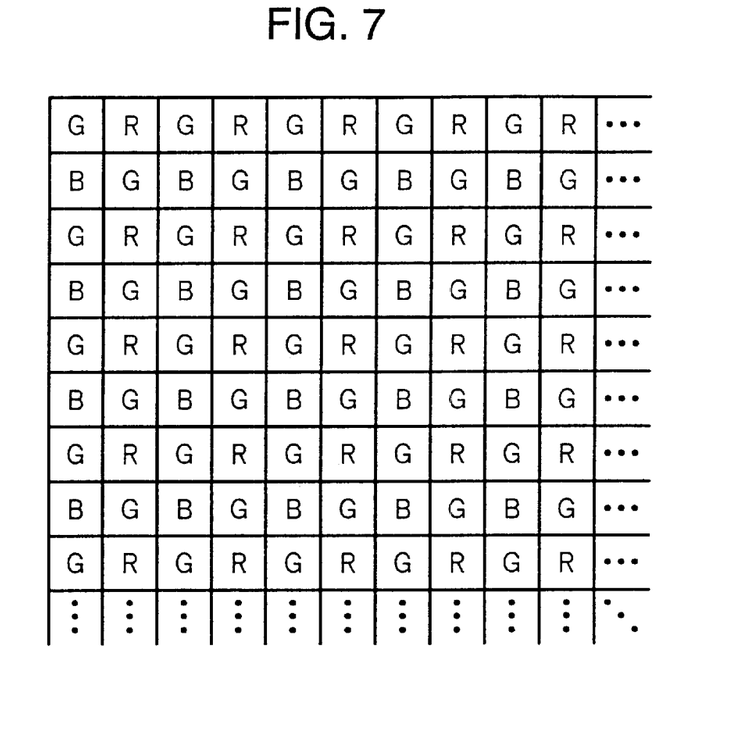
FIG. 7 illustrates the structure of a color filter array.

The color filter array may have a structure achieved by arranging color filters in three colors, i.e., R, G and B, in the Bayer array, as illustrated in FIG. 7. In an image-capturing element that captures an image of a subject which has been transmitted through a color filter array structured as described above, color information representing a single color is generated at each pixel.

Namely, even if the color image is expressed through a colorimetric system constituted of three color components, only one color component is obtained at each pixel.

Thus, in order to obtain all the color components at the individual pixels, digital still cameras and image processing apparatuses that perform image processing on color images may have a function of performing interpolation processing (processing through which the interpolation quantities corresponding to the values of missing color components are determined) on a digitized color image.

While pixels having the same color component manifest a high degree of spatial similarity in a normal color image, pixels having different color components in the same color image have only a low degree of spatial similarity (similarity among different color components). Consequently, in order to determine an interpolation quantity for a pixel that is to undergo interpolation processing, under normal circumstances a method is employed in which the value representing a color component of a pixel that is located near the pixel to undergo interpolation processing and has a color component that is missing from the pixel to undergo interpolation processing is used.

For instance, when performing interpolation processing for the green color component on a "pixel having a red or blue color component", the average value of color component values corresponding to "a plurality of pixels (four pixels in FIG. 7) having a green color component" adjacent to the "pixel having a red or blue color component" is used as the interpolation quantity.

Figure 8:
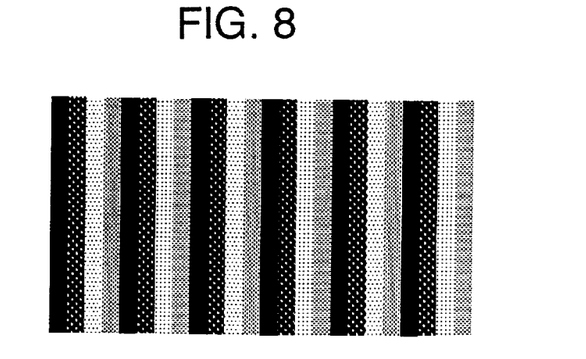
FIG. 8 illustrates a portion of an image with gray longitudinal stripes.

Now, let us consider a case in which such interpolation processing is performed on a color image with longitudinal gray stripes, as illustrated in FIG. 8.

Figure 9:
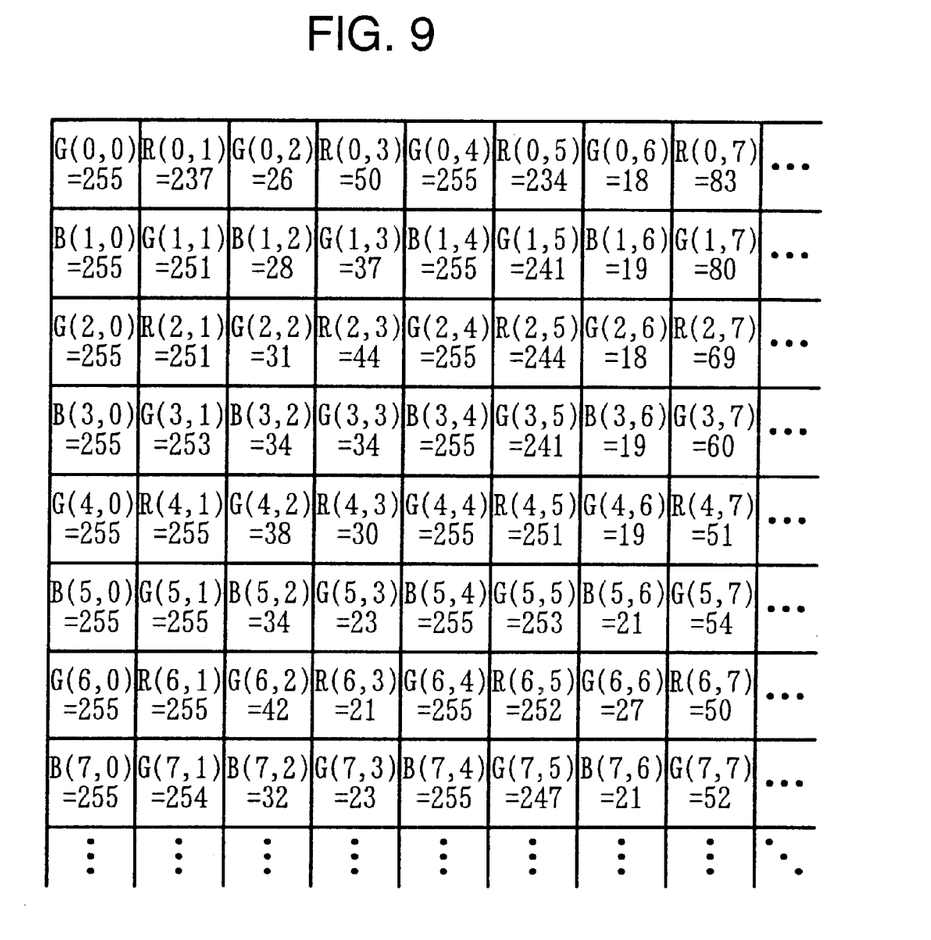
FIG. 9 presents color component values corresponding to individual pixels.

First, it is assumed that the color component values corresponding to the individual pixels achieved when the image illustrated in FIG. 8 is projected on the color filters shown in FIG. 7 are as indicated in FIG. 9. In addition, in FIG. 9, G(0,0), G(0,2), ..., G(7,7) are values of the green color component, R(0,1), R(0,3), ..., R(6,7) are values of the red color component, B(1,0), B(1,2), ... B(7,6) are values of the blue color component.

For instance, the green interpolation quantity G(4,3) for the pixel (4,3) having the red color component is calculated to be:

$$G(4, 3) = [G(3, 3) + G(4, 2) + G(4, 4) + G(5, 3)]/4$$
$$= (34 + 38 + 255 + 23)/4$$
$$\approx 87$$

Now, in the case of the color image illustrated in FIG. 8, which demonstrates a high degree of similarity in the longitudinal direction, G(4,3) needs to maintain continuity with G(3,3) and G(5,3). However, if G(4,3) is set to G(4,3)≈87 as described above, the continuity between G(4, 3) and G(3,3) and between G(4,3) and G(5,3) becomes broken.

In other words, if the interpolation processing described above is performed on a gray image, correct interpolation quantities cannot be calculated, resulting in a problem that false colors that are not present in the original image are generated. In addition, this problem occurs not only when the interpolation processing discussed above is performed on gray images but also when the interpolation processing is performed on single-hue images (e.g., sepia-tone images).

It is to be noted that this problem is likely attributable to the interpolation processing, which is performed on the assumption that all color images have the characteristics described above, i.e., characteristics such that pixels having the same color component manifest a high degree of spatial similarity and pixels having different color components manifest a low degree of spatial similarity.

Now, a "photographing mode selector switch" that switches between a gray image photographing mode and a normal color image photographing mode, for instance, may be provided at the casing of the electronic still camera to achieve interpolation processing that supports different characteristics of color images. However, when this method is adopted, the operator is required to select the gray image photographing mode by operating the "photographing mode selector switch" to photograph text and monochrome test charts.

SUMMARY OF THE INVENTION

An object of the present invention is to provide an interpolation processing apparatus that is capable of obtaining characteristics of a given color image and performing interpolation processing corresponding to the characteristics with a high degree of reliability and to provide a recording medium having an interpolation processing program that is capable of obtaining characteristics of a given color image and performing interpolation processing corresponding to the characteristics with a high degree of reliability, recorded therein.

In order to attain the above object, an interpolation processing apparatus according to the present invention comprises: an interpolation processing unit that performs interpolation processing on a color image expressed through a colorimetric system constituted of a predetermined plurality of color components to determine an interpolation quantity corresponding to a value representing a missing color component in each pixel; and a color composition identification unit that identifies a color component composition of the color image. And the interpolation processing unit is capable of performing a plurality of types of interpolation processing in correspondence to color component compositions of the color image, selects a type of interpolation processing corresponding to the color component composition identified by the color composition identification unit and performs the type of interpolation processing that has been selected on the color image.

A recording medium according to the present invention records an interpolation processing program to be executed by a computer. The interpolation program comprises: a procedure in which a color component composition of a color image expressed through a colorimetric system constituted of a predetermined plurality of color components are identified; a procedure in which one type of interpolation processing that corresponds to the color component composition that has been identified is selected from a plurality of types of interpolation processing corresponding to color component compositions of the color image; and a procedure in which the interpolation processing that has been selected is executed and an interpolation quantity corresponding to a value of a color component missing in each pixel is determined for the color image.

An electronic camera according to the present invention comprises: an image-capturing device that has a plurality of pixels and generates an image by capturing an image of a subject; color filters that are provided in correspondence to a plurality of pixels of the image-capturing device and are constituted by adopting a colorimetric system constituted of a plurality of color components; an interpolation processing device that performs interpolation processing on a color image generated by the color filters and the image-capturing device to determine an interpolation quantity corresponding to a value of a missing color component in each pixel; and a color composition identification device that identifies a color component composition of the color image. And the interpolation processing device is capable of performing a plurality of types of interpolation processing in correspondence to color component compositions of the color image, selects a type of interpolation processing that corresponds to the color component composition identified by the color composition identification device and performs the type of interpolation processing that has been selected on the color image.

In the above interpolation processing apparatus and electronic camera, preferably, when the interpolation processing unit or device decides that the color image is either one of a single-hue image and a gray image based upon the color component composition identified by the color composition identification unit or device, the interpolation processing unit or device selects an interpolation processing that uses a value corresponding a value of a color component of a pixel to undergo interpolation processing as an interpolation quantity for another color component in the pixel.

DESCRIPTION OF THE PREFERRED EMBODIMENTS

The following is a detailed explanation of the preferred embodiments of the present invention given in reference to the drawings.

First Embodiment

Figure 1:
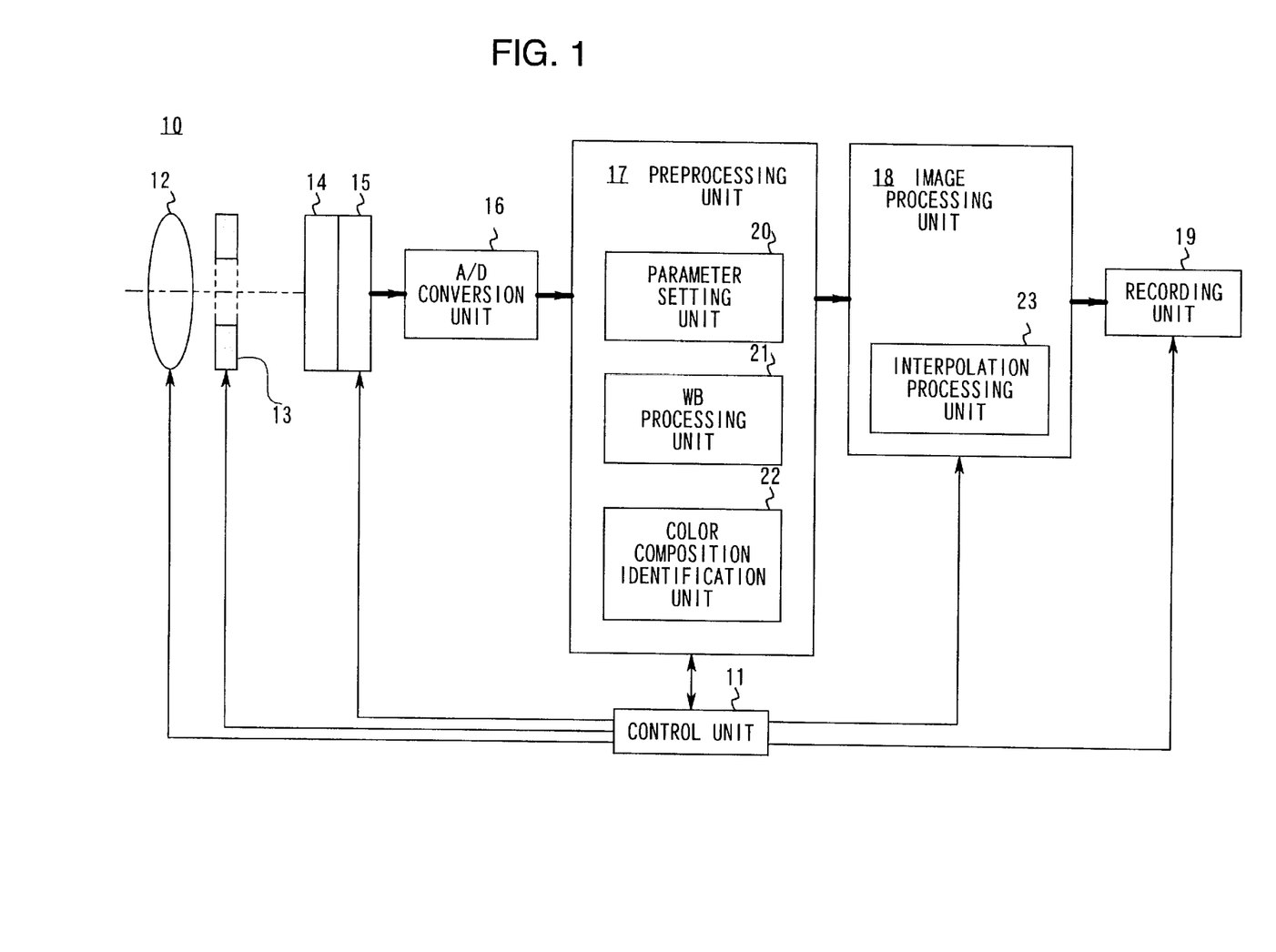
FIG. 1 is a functional block diagram of an electronic still camera.

FIG. 1 is a functional block diagram of the electronic still camera in the first embodiment. In FIG. 1, an electronic still camera 10 is provided with a control unit 11, a lens 12, an aperture 13, a CFA (color filter array) 14, an image-capturing element 15, an A/D conversion unit 16, a preprocessing unit 17, an image processing unit 18 and a recording unit 19.

The preprocessing unit 17 is provided with a parameter setting unit 20 that determines the parameters required in AF (auto focus adjustment), AE (auto exposure) and white balance, a WB processing unit 21 that performs white balance and a color composition identification unit 22 that identifies the color component composition. As illustrated in FIGS. 7 and 9, the CFA 14 is constituted by arranging color filters in three colors, i.e., R, G and B in a Bayer array. The image-capturing element 15, which may be constituted of, for instance, a CCD having a plurality of pixels arranged in a matrix, converts an optical image of a subject or the like to an electrical signal.

In addition, the image processing unit 18 is provided with an interpolation processing unit 23. Furthermore, the interpolation processing unit 23 has a function of performing "interpolation processing for gray images" and "interpolation processing for normal color images" that are to be detailed later.

It is to be noted that while only the interpolation processing unit 23 is illustrated inside the image processing unit 18 in FIG. 1 to simplify the explanation, blocks for performing other types of image processing such as edge detection may be provided in the image processing unit 18.

In FIG. 1, the control unit 11 is also connected to the lens 12 via a lens drive unit (not shown) is connected to the aperture 13 via an aperture drive unit (not shown) and is connected to the image-capturing element 15, the preprocessing unit 17, the image processing unit 18 and the recording unit 19. It is to be specially noted that the control unit 11 is interactively connected with the preprocessing unit 17.

The interpolation processing should be regarded as a concept that includes a "function of comparing the difference in color averages with a threshold values" and the like achieved by the control unit 11 as well as the processing performed at the interpolation processing unit 23.

When the color image to undergo the interpolation processing is a gray image (an achromatic color image or a monochrome image), the likelihood of the color averages of the individual color components being extremely close to one another over all the areas achieved through division is high. In other words, it is highly likely that the differences in the color averages among the individual color components will be practically 0 in all the areas and that the ratio of the color averages among the individual color components will be approximately 1 in all the areas.

As a result, by making a decision as to whether or not the differences in the color averages among the individual color components corresponding to all the areas are equal to or less than a predetermined value or by making a decision as to whether or not the ratios of the color averages among the individual color components corresponding to all the areas are within predetermined ranges, a decision in regard to whether or not the color image to undergo interpolation processing is a gray image can be made easily. In the first embodiment, a decision is made in regard to whether or not the color image to undergo interpolation processing is a gray image based upon this concept.

Figure 2:
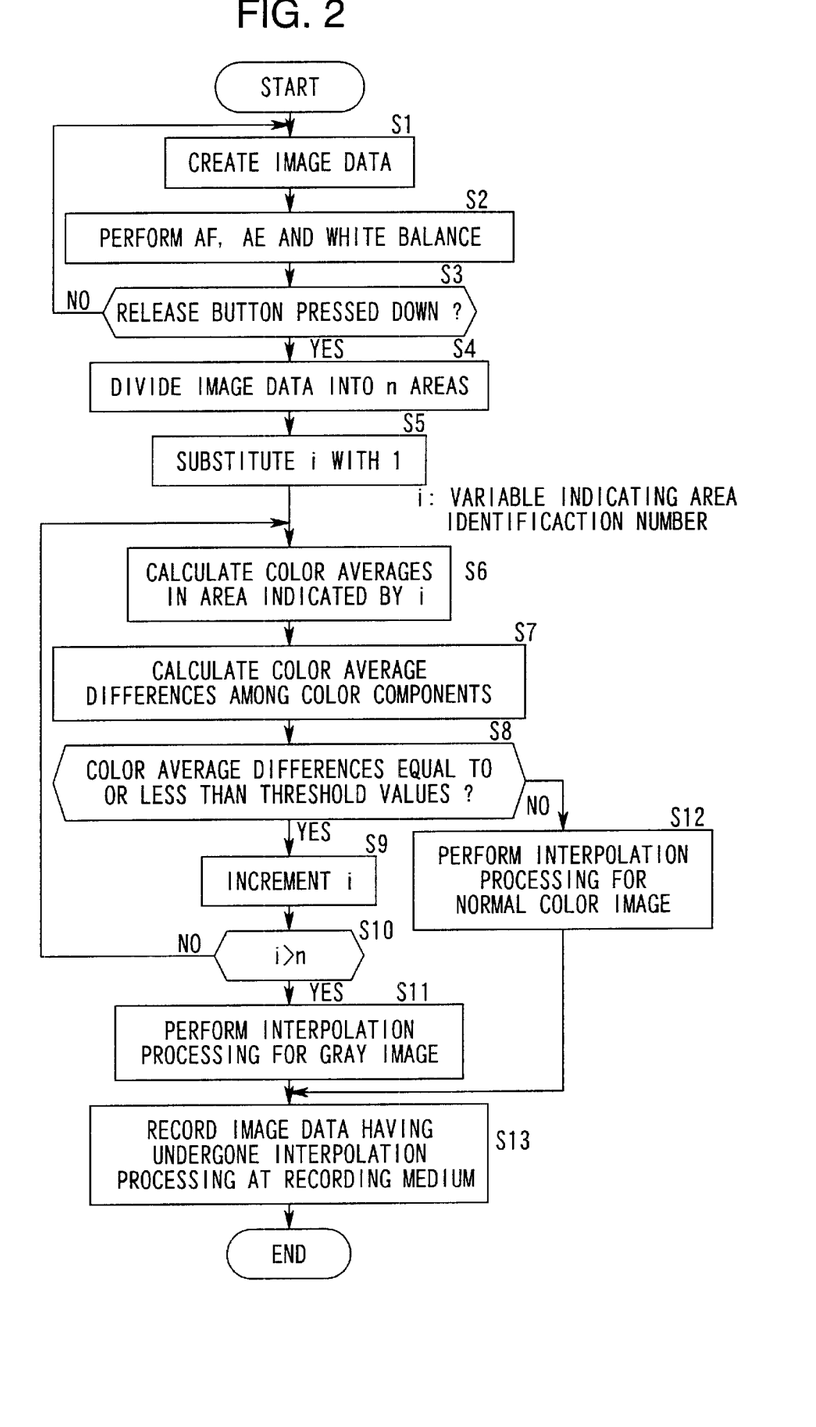
FIG. 2 is an operation flowchart of a first embodiment.

FIG. 2 is an operation flowchart of the first embodiment. The following is an explanation of the operation achieved in the first embodiment given in reference to FIGS. 1 and 2.

In a state in which the main power is turned on, an optical image provided via the lens 12 and the aperture 13 is formed on a photoelectric conversion surface (not shown) at the image-capturing element 15 and through photoelectric conversion, a signal charge is generated. In addition, the image-capturing element 15 scans the signal charge thus generated to generate an image signal which is then provided to the A/D conversion unit 16.

It is to be noted that the processing related to the generation of the image signal is performed based upon the timing control executed by the control unit 11.

The A/D conversion unit 16 performs A/D conversion of the image signal provided by the image-capturing element and generates image data (FIG. 2, S1). It is to be noted that in the first embodiment and the subsequent embodiments that are to be detailed later, the image data corresponds to the value representing the color component of each pixel at the image-capturing element 15. In other words, the color component value corresponds to the quantity of electrical charge generated through the photoelectric conversion of the light having passed through the color filter at each pixel at the image-capturing element 15. The color component value is represented with 8 bits and corresponds to the value that is proportional to the photoelectric conversion quantity. The color component value may correspond to the value after performing various kinds of processing (γ conversion for example).

It is to be noted that the image data thus generated are provided to the preprocessing unit 17 and are also provided to the image processing unit 18 after they undergo white balance processing at the WB processing unit 21 within the preprocessing unit 17.

The parameter setting unit 20 inside the preprocessing unit 17 determines the parameters required for AF (auto-focus adjustment) and AE (auto-exposure) based upon the image data provided by the A/D conversion unit 16 and notifies the control unit 11 of the parameters thus determined. It also determines the parameter required for white balance processing and notifies the WB processing unit 21 of the parameter thus determined.

Upon receiving the notifications of the parameters in this manner, the control unit 11 performs AF (auto-focus adjustment) and AE (auto-exposure) via the lens drive unit and the aperture drive unit (not shown), whereas the WB processing unit 21 performs white balance processing (FIG. 2, S2).

In addition, the control unit 11 makes a decision as to whether or not a shutter release button (not shown) provided at the casing of the electronic still camera 10 has been pressed down (FIG. 2, S3).

Each time it is ascertained that the shutter release button has not been pressed down through such decision-making, the creation of image data described above (FIG. 2, S1), AF (auto-focus adjustment), AE (auto-exposure) and white balance processing (FIG. 2, S3) are repeated.

If, on the other hand, it is obtained that the shutter release button has been pressed down, the control unit 11 issues an instruction for executing "processing for identifying the color component composition of the image data" to the color composition identification unit inside the preprocessing unit 17.

Figure 3:
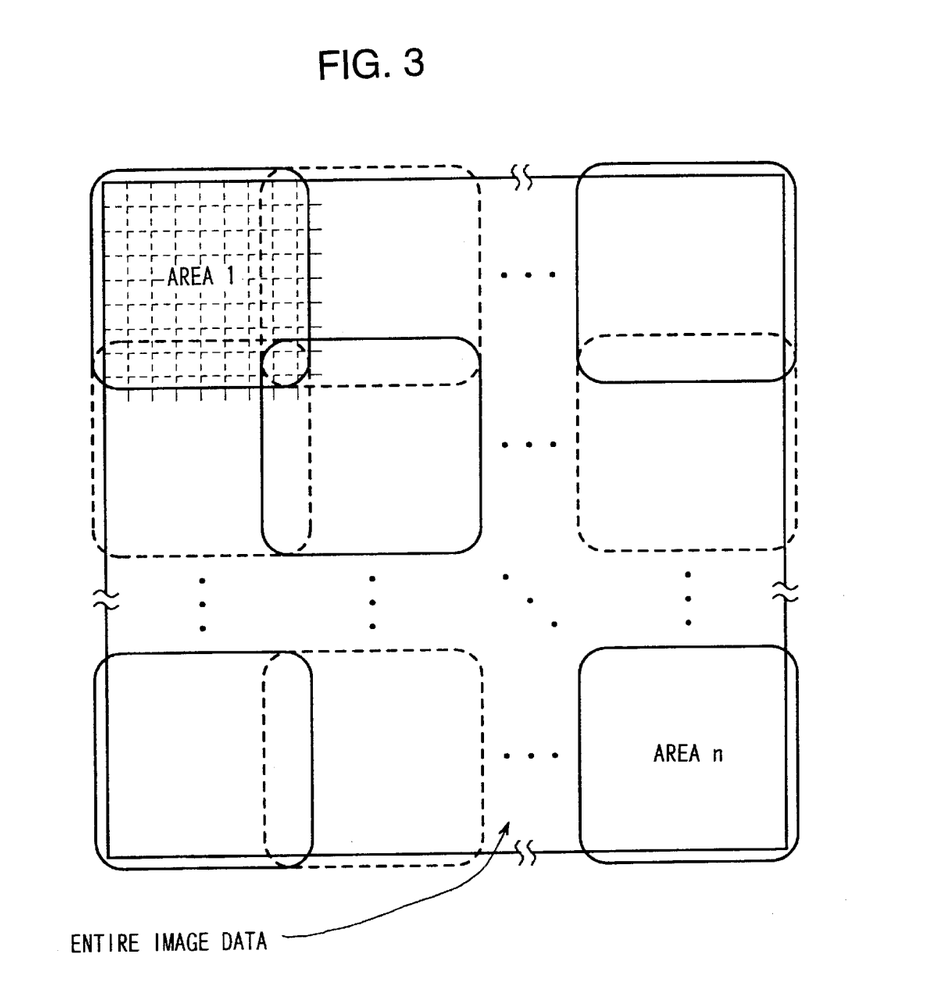
FIG. 3 illustrates an example of image data division.

Upon receiving the instruction, the color composition identification unit 20 divides the image data corresponding to one frame to n areas while allowing for overlapping, as illustrated in FIG. 3 (FIG. 2, S4).

At this point, the control unit 11 substitutes the variable i indicating the identification number of each area with 1 (FIG. 2, S5).

The color composition identification unit 22 calculates the color averages representing the average values of the color components of the individual pixels in the area indicated by-the variable i (FIG. 2, S6).

It is to be noted that in the first embodiment and the other embodiments that are to be detailed later, the color averages of the individual color components in each area are indicated as Ri, Gi and Bi (i=1, 2, ... n).

For instance, if the area 1 comprises 8 pixels×8 pixels as illustrated in FIG. 8, with the color component of each pixel achieving the value shown in FIG. 9, the color averages R1, G1 and B1 in the area 1 are calculated as;

$$R1 = [R(0, 1) + R(0, 3) + \ldots + R(6, 5) + R(6, 7)]/16$$
$$= (237 + 50 + \ldots 252 + 50)/16$$
$$\approx 148$$
$$G1 = [G(0, 0) + G(0, 2) + \ldots + G(7, 5) + G(7, 7)]/32$$
$$= (255 + 26 + \ldots 247 + 52)/32$$
$$\approx 144$$
$$B1 = [B(1, 0) + B(1, 2) + \ldots + B(7, 4) + B(7, 6)]/16$$
$$= (255 + 28 + \ldots 255 + 21)/16$$
$$\approx 140$$

In addition, after calculating the color averages in this manner, the color composition identification unit 22 calculates the differences in the color averages of the individual color components (FIG. 2, S7).

Namely, the differences in the color averages of the individual color components in the area 1 are;

$$|R1-G1|=4$$
$$|B1-G1|=4$$
$$|R1-B1|=8$$

It is to be noted that the differences in the color averages of the individual color components thus calculated are reported to the control unit 11.

The control unit 11 makes a decision as to whether or not the differences in the color averages of the individual color components, of which it has been notified as described above are each equal to or less than a threshold values (FIG. 2, S8).

For instance, the control unit 11 makes a decision as to whether or not;

($|Ri-Gi| \leq T1$

∩ ($|Bi-Gi| \leq T2$

∩ ($|Ri-Bi| \leq T3$ is true in regard to the differences in the color averages of the individual color components in the area indicated by the variable i. In other words, it makes a decision as to whether or not all the differences in the color averages among the individual color components are each equal to or less than a specific threshold values. It is to be noted that while T1, T2 and T3 are arbitrary values, they are set to;

T1=T2=T3=10, in the first embodiment.

When it is obtained through such decision-making that the differences in the color averages among the individual color components are equal to or less than the threshold values, the control unit 11 increments the variable i (FIG. 2, S9) and makes a decision as to whether or not the variable i has exceeded n (FIG. 2, S10).

When the control unit 11 ascertains that the differences in the color averages among the individual color components are equal to or less than the threshold values, with the variable i equal to or less than n, it repeatedly issues instructions to the color composition identification unit 22 to "calculate the color averages in the area indicated by the variable i (FIG. 2, S6)" and to "calculate the differences in the color averages among the individual color components (FIG. 2, S7)", and repeatedly executes the "decision-making in regard to the color average differences (corresponds to FIG. 2, S8)".

In addition, if the control unit 11 ascertains that the variable i has exceeded n during the process in which the processing in steps S6~S10 in FIG. 2 is repeatedly executed as described above, the control unit 11 issues an instruction to the interpolation processing unit 23 inside the image processing unit 18 to execute interpolation processing for a gray image (FIG. 2, S11).

In other words, if the differences in the color averages among the individual color components are equal to or less than the threshold values in all the areas, the control unit 11 decides that the color averages of the individual color components are extremely close to one another in all the areas and assumes that the image data to undergo interpolation processing represent a gray image.

Now, if the control unit 11 ascertains that a difference in the color averages among the individual color components has exceeded the threshold values in the "decision-making in regard to the color average differences (corresponds to FIG. 2, S8)", it issues an instruction to the interpolation processing unit 23 inside the image processing unit 18 to execute interpolation processing for a normal color image regardless of the value of the variable i.

Namely, if there is even one area where the difference in the color average between individual color components exceeds the threshold value, the control unit 11 decides that the similarity among the different color components is low and assumes that the image data to undergo the interpolation processing represent a normal color image.

When the interpolation processing unit 23 receives the instruction to execute the interpolation processing for a gray image issued by the control unit 11, it directly uses the value of the color component of a given pixel to undergo the interpolation processing as the interpolation quantities for the pixel.

For instance, the green color interpolation quantity G(4,3) of the pixel (4,3) having the red color component is;

$$G(4, 3) = R(4, 3)$$
$$= 30$$

and its blue color interpolation quantity B(4,3) is;

$$B(4, 3) = R(4, 3)$$
$$= 30.$$

If, on the other hand, the interpolation processing unit 23 receives the instruction to execute the interpolation processing for a normal color image issued by the control unit 11, it determines an interpolation quantity by using the value of the color component of a pixel located near the pixel to undergo the interpolation processing that has a color component missing from the pixel as in the interpolation processing method employed in the prior art.

It is to be noted that with the interpolation quantities determined in this manner, the image data that have undergone interpolation processing are recorded at a recording medium such as a memory card via the recording unit 19 (FIG. 2, S13).

In the first embodiment, if the color averages of the individual color components are very close to one another and their differences are equal to or less than the threshold values in all the areas, the interpolation processing for a gray image is performed on the image data, as explained above. If there is even one area where the differences in the color averages among the individual color components exceed the threshold values, the interpolation processing for a normal color image is performed on the image data.

While it is conceivable to employ a method in which the color averages are calculated for the entire image data to make a decision in regard to the color average differences, the color component composition cannot be obtained with a high degree of accuracy through this method since it is likely that the difference of the color component composition per local or small area can not be detected. In contrast, in the first embodiment, in which the image data are divided into a plurality of areas and the color averages are calculated in units of individual areas, the color component composition can be identified with a high degree of accuracy.

In other words, in the first embodiment, the decision in regard to whether the image data to undergo the interpolation processing represent a gray image or a normal color image can be made with ease and a high degree of accuracy so that the interpolation processing that is suited to the image data color component composition can be selected in correspondence to the results of the decision-making.

Consequently, in the first embodiment, interpolation processing can be performed quickly and accurately.

It is to be noted that while a decision is made in regard to whether or not the differences in the color averages among the individual color components are equal to or less than specific threshold values as shown in FIG. 2, S8 to identify the color component composition of the image data to undergo interpolation processing in the first embodiment, a decision may be made in regard to whether or not the ratios of the color averages among the individual color components are within a specific range, instead. Namely, since the color average values are equal to one another when the ratios of the color averages among the individual color components is 1, a decision may be made in regard to whether or not the color average ratios are within the specific ranges around a color average ratio of 1.

For instance, a decision may be made in regard to whether or not;

(|Ri/Gi−1|≦T4)

∩ (|Bi/Gi−1|≦T5)

∩ (|Ri/Bi−1|≦T6)

is true regarding the color averages in the area indicated by the variable i. While T4, T5 and T6 represent arbitrary values, they may be set so that, for instance, T4=T5=T6=0.05.

In addition, while the size of each of the plurality of areas achieved by dividing the image data in the first embodiment is 8 pixels×8 pixels, the size of the divided areas may be reduced, since the difference of the color component composition per smaller area can be detected when an image-capturing element having a great number of pixels per unit area is employed. Moreover, if an image-capturing element having a small number of pixels per unit area is utilized, the size of the individual areas may be increased.

Furthermore, while the "decision-making in regard to the color average differences" is performed immediately after the color averages are calculated and the differences in the color averages among the individual color components are calculated for each area in the first embodiment, the "decision-making in regard to the color average differences" may be performed for the individual areas, for instance, after calculating the differences in the color averages among the individual color components in all the areas, instead.

Second Embodiment

Figure 4:
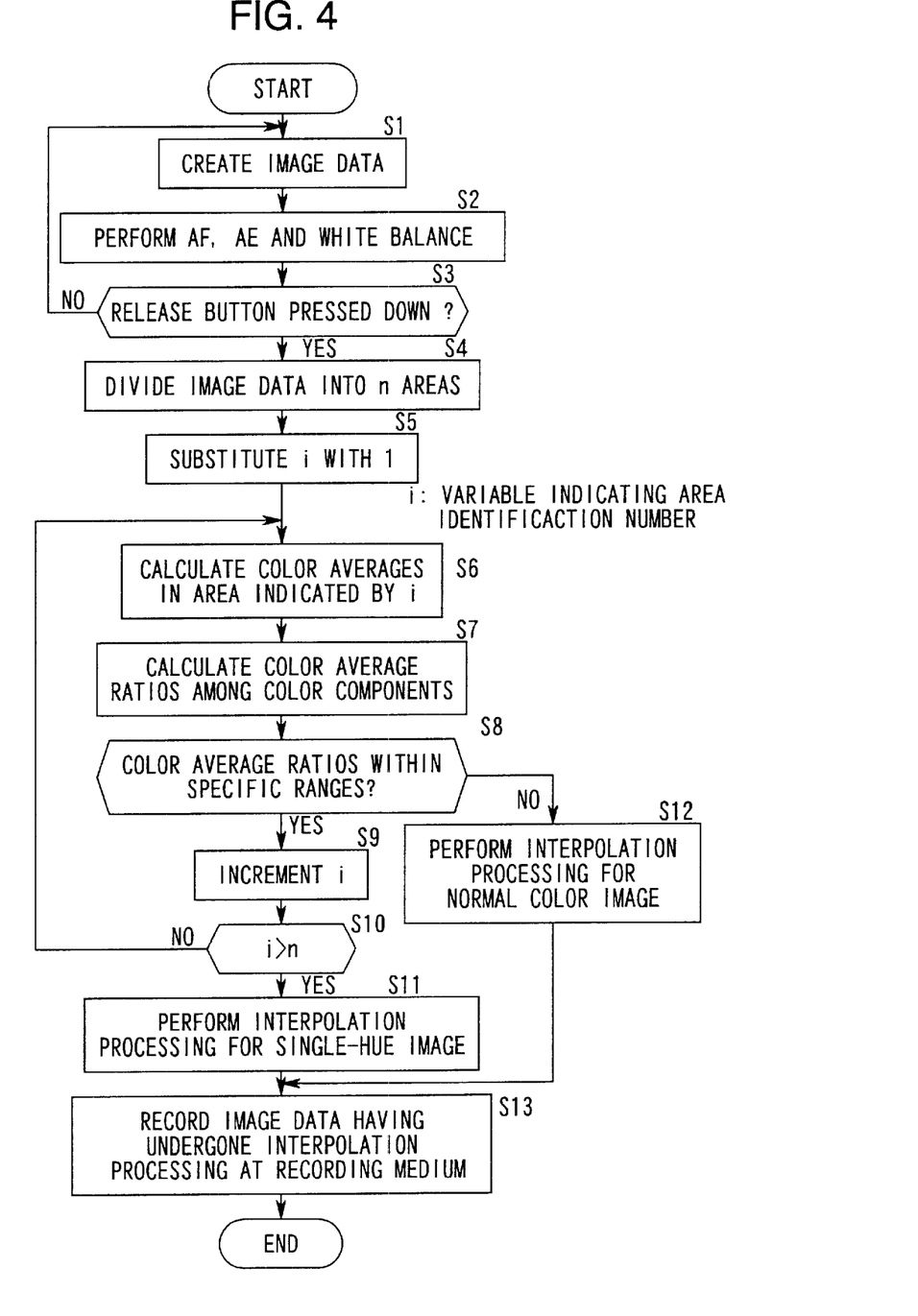
FIG. 4 is an operation flowchart of a second embodiment.

FIG. 4 is an operation flowchart of the second embodiment. Since the second embodiment is characterized by its method for "processing for identifying the color component composition" and "interpolation processing" and its hardware configuration is identical to that adopted in the first embodiment illustrated in FIG. 1, the explanation of the hardware is omitted here.

In the second embodiment, the interpolation processing unit 23 has a function of performing "interpolation processing for a single-hue image" to be explained later and "interpolation processing for a normal color image."

Since the processing performed in steps S1~S6, S9, S10 and S13 in FIG. 4 is identical to the processing performed in the first embodiment illustrated in FIG. 2 (FIG. 2 S1~S6, S9, S10 and S13), a detailed explanation of the operation performed in those steps is omitted.

The interpolation processing as referred to in this context represents a concept that includes a "function of determining whether or not the color average ratios are within specific ranges" fulfilled by the control unit 11 as well as the processing performed by the interpolation processing unit 23.

When a color image to undergo interpolation processing is a single-hue image (such as a sepia-tone image), it is highly likely that the compositions achieved by the individual color components in all the areas formed through the division are extremely similar to one another. Namely, it is highly likely that the differences in the color averages among the individual color components or the color average ratios of the individual color components are very close to one another in all the areas.

Thus, a decision can be made easily as to whether or not the color image to undergo interpolation processing is a single-hue image by making a decision as to whether or not the differences in the color averages among the individual color components or the ratios of the color averages among the individual color components are within predetermined ranges for all the areas. In the second embodiment, based upon this concept, a decision is made as to whether or not the color image to undergo the interpolation processing is a single-hue image.

The following is an explanation of the operation performed in the second embodiment given in reference to FIGS. 1 and 4.

As in the first embodiment, when the control unit 11 ascertains that the shutter release button has been pressed down, it issues an instruction to the color composition identification unit 22 inside the preprocessing unit 17 to execute "processing for identifying the color component composition of the image data."

Upon receiving this instruction, the color composition identification unit 22 divides the image data into n areas as in the first embodiment (FIG. 4, S4).

At this point, the control unit 11 substitutes the variable i that indicates the identification number of each area with 1, as in the first embodiment (FIG. 4, S5).

The color composition identification unit 22 calculates the color averages in the area indicated by the variable i (FIG. 4, S6) and calculates the ratios of the color averages among the individual color components (FIG. 4, S7), as in the first embodiment.

In other words, the color composition identification unit 22 calculates the ratios of the color averages of the individual color components in the area indicated by the variable i, i.e., Ri/Gi Bi/Gi and Ri/Bi.

It is to be noted that the color average ratios among the individual color components thus calculated are reported to the control unit 11.

The control unit 11 makes a decision as to whether or not the color average ratios among the individual color components which it has been notified of in this manner are within specific ranges (FIG. 4, S8).

For instance, the control unit 11 may make a decision as to whether or not;

(|Ri/Gi−T10|≦T11)

∩ (|Bi/Gi−T20|≦T21)

∩ (|Ri/Bi−T30|≦T31)

is true in regard to the color average ratios among the individual color components in the area indicated by the variable i.

It is to be noted that while T10, T11, T20, T21, T30 and T31 represent arbitrary values, they are set to achieve;

T10=R1/G1

T11=T10×0.05

T20=B1/G1

T21=T20×0.05

$$T30=R1/B1$$

$$T31=T30\times0.05$$

in the second embodiment. In other words, in the second embodiment, a decision is made as to whether or not the color average ratios among the individual color components are very close to one another in all the areas by referring to the color average ratios among the individual color components in the area 1.

When the control unit 11 obtains through such decision-making that the color average ratios among the individual color components are within the specific ranges, it increments the variable i (FIG. 4, S9) and makes a decision as to whether or not the variable i has exceeded n (FIG. 4, S10).

When the control unit 11 ascertains that the color average ratios among the individual color components are within the specific ranges with the variable not exceeding n yet, it repeatedly issues instructions to the color composition identification unit 22 to "calculate the color averages in the area indicated by the variable i (FIG. 4, S6)" and to "calculate the color average ratios among the color components (FIG. 4, S7)" and repeatedly execute the "decision-making in regard to the color average ratios (corresponds to FIG. 4, S8).

In addition, during the process in which the processing in steps S6~S10 in FIG. 4 is repeatedly performed as described above, if the control unit 11 ascertains that the variable i has exceeded n, it issues an instruction to the interpolation processing unit 23 inside the image processing unit 18 to execute interpolation processing for a single-hue image (FIG. 4, S11).

In other words, when the color average ratios among the individual color components are within the specific ranges explained above in all the areas, the control unit 11 decides that the color average ratios among all the color components are extremely close to one another in all the areas and assumes that the image data to undergo interpolation processing represent a single-hue image. To rephrase this, the control unit 11 makes a decision as to whether or not the color average ratios among the individual color components are within specific ranges around reference values. The color average ratios in a given area are set as the reference values.

Now, if the control unit 11 ascertains that any of the color average ratios among the individual color components are not within the specific range through the "decision-making in regard to the color average ratios (corresponds to FIG. 4, S8)", it issues an instruction to the interpolation processing unit 23 inside the image processing unit 18 to execute interpolation processing for a normal color image, regardless of the value of the variable i (FIG. 4, S12).

In other words, if there is even one area in which any of the color average ratios among the individual color components are not within the specific ranges, the control unit 11 decides that the degree of similarity among the different color components is low and assumes that the image data to undergo interpolation processing represent a normal color image.

The interpolation processing unit 23, upon receiving the instruction to execute the interpolation processing for a single-hue image issued by the control unit 11, determines an interpolation quantity by performing weighted addition of the value of the color component of the pixel to undergo interpolation processing and the values of the color components of pixels located near the pixel. It is to be noted that the addition weight of the value of the color component of the pixel to undergo the interpolation processing is set high.

For instance, the interpolation processing unit 23 calculates the green color interpolation quantity G(4,3) and the blue color interpolation quantity B(4,3) for a pixel (4,3) having the red color component as follows;

$$G(4,3)=Q11\times R(4,3)+Q12\times(G(3,3)+G(4,2)+G(4,4)+G(5,3))/4$$

$$B(4,3)=Q21\times R(4,3)+Q22\times(B(3,2)+B(5,2)+B(3,4)+B(5,4))/4,$$

with Q11, Q12, Q21 and Q22 being weighting factors (coefficients). that satisfy;

$$Q11+Q12=1$$

$$Q11>Q12$$

$$Q21+Q22=1$$

$$Q21>Q22$$

It is to be noted that when the requirement is imposed upon the weighting factors that they be inverse proportion to the distance from the pixel to undergo the interpolation processing, additional conditions such as;

$$Q11=4/5$$

$$Q12=1/4$$

$$Q21=7/8$$

$$Q22=1/8$$

may be set for Q11, Q12, Q21 and Q22 so that Q21−Q22>Q11−Q12 is satisfied.

In addition, if the weighting factors are to reflect the color component composition, $f(X)=X/100$, for instance may be used, with Q11, Q12, Q21 and Q22 set to satisfy;

$$Q11=1-f(|R1-G1|)$$

$$Q12=f(|R1-G1|)$$

$$Q21=1-f(|R1-B1|)/2$$

$$Q22=f(|R1-G1|)/2$$

It is to be noted that the red color interpolation quantity R(3,3) and the blue color interpolation quantity B(3,3) for a pixel (3,3) having the green color component are calculated as follows;

$$R(3,3)=Q31\times G(3,3)+Q32\times(R(2,3)+R(4,3))/2$$

$$B(3,3)=Q41\times G(3,3)+Q42\times(B(3,2)+B(3,4))/2,$$

with Q31, Q32, Q41 and Q42 being weighting factors that satisfy;

$$Q31+Q32=1$$

$$Q31>Q32$$

$$Q41+Q42=1$$

$$Q41>Q42$$

If, on the other hand, the interpolation processing unit 23 receives the instruction to execute the interpolation processing for a normal color image issued by the control unit 11 as explained above, it determines an interpolation quantity by using the value of the color component of a pixel located near the pixel to undergo the interpolation processing that has a color component missing from the pixel as in the interpolation processing method employed in the prior art.

As explained above, in the second embodiment, if the color averages of the individual color components are very close to one another in all the areas, the interpolation processing for a single-hue image is performed on the image data, whereas, if there is even one area where any of the color average ratios among the individual color components are not within the specific range, the interpolation processing for a normal color image is performed on the image data.

In the second embodiment, as in the first embodiment in which the image data are divided into a plurality of areas and the color averages are calculated in units of individual areas, the color component composition can be identified with a high degree of accuracy.

In other words, in the second embodiment, the decision in regard to whether the image data to undergo the interpolation processing represent a single-hue image or a normal color image can be made with ease and a high degree of accuracy so that the interpolation processing that is suited to the image data color component composition can be selected in correspondence to the results of the decision-making.

Consequently, in the second embodiment, interpolation processing can be performed quickly and accurately.

It is to be noted that while a decision is made in regard to whether or not the color average ratios among the individual color components are within specific ranges as shown in FIG. 4, S8 to identify the color component composition of the image data to undergo interpolation processing in the second embodiment, a decision may be made in regard to whether or not the differences in the color averages among the individual color components are within specific ranges, instead.

For instance, a decision may be made in regard to whether or not $(|Ri-Gi-T40|<-T41)$ $\cap (|Bi-Gi-T50|\leq T51)$ $\cap (|Ri-Bi-T60|\leq T61)$ are true regarding the color averages in the area indicated by the variable i. While T40, T41, T50, T51, T60 and T61 represent arbitrary values, they may be set so that, for instance,

T40=R1-G1

T50=B1-G1

T60=R1-B1

T41=T51=T61=10

In addition, while the interpolation processing for a single-hue image is performed as described above in the second embodiment, the value of the color component of a pixel to undergo interpolation processing may be used at the interpolation quantities for the pixel, as in the first embodiment.

Furthermore, while the "decision-making in regard to the color average ratios" is performed immediately after the color averages are calculated and the color average ratios among the individual color components are calculated for each area in the second embodiment, the "decision-making in regard to the color average ratios" may be performed for the individual areas, for instance, after calculating the color average ratios among the individual color components in all the areas, instead.

While the interpolation processing for a gray image is performed when image data are obtained as a gray image in the first embodiment explained earlier and the interpolation processing for a single-hue image is performed when image data are obtained as a single-hue image in the second embodiment, the first embodiment and the second embodiment may be combined by providing an interpolation processing unit having functions of performing the "interpolation processing for a gray image", "interpolation processing for a single-hue image" and "interpolation processing for a normal color image" so that interpolation processing appropriate to various types of images can be achieved after identifying gray images, single-hue images (excluding gray images) and normal color images.

In addition, images to be identified are not limited to gray images and single-hue images and as long as their characteristics can be identified in correspondence to the color component compositions, interpolation processing appropriate to the characteristics can be achieved.

Third Embodiment

Figure 5:
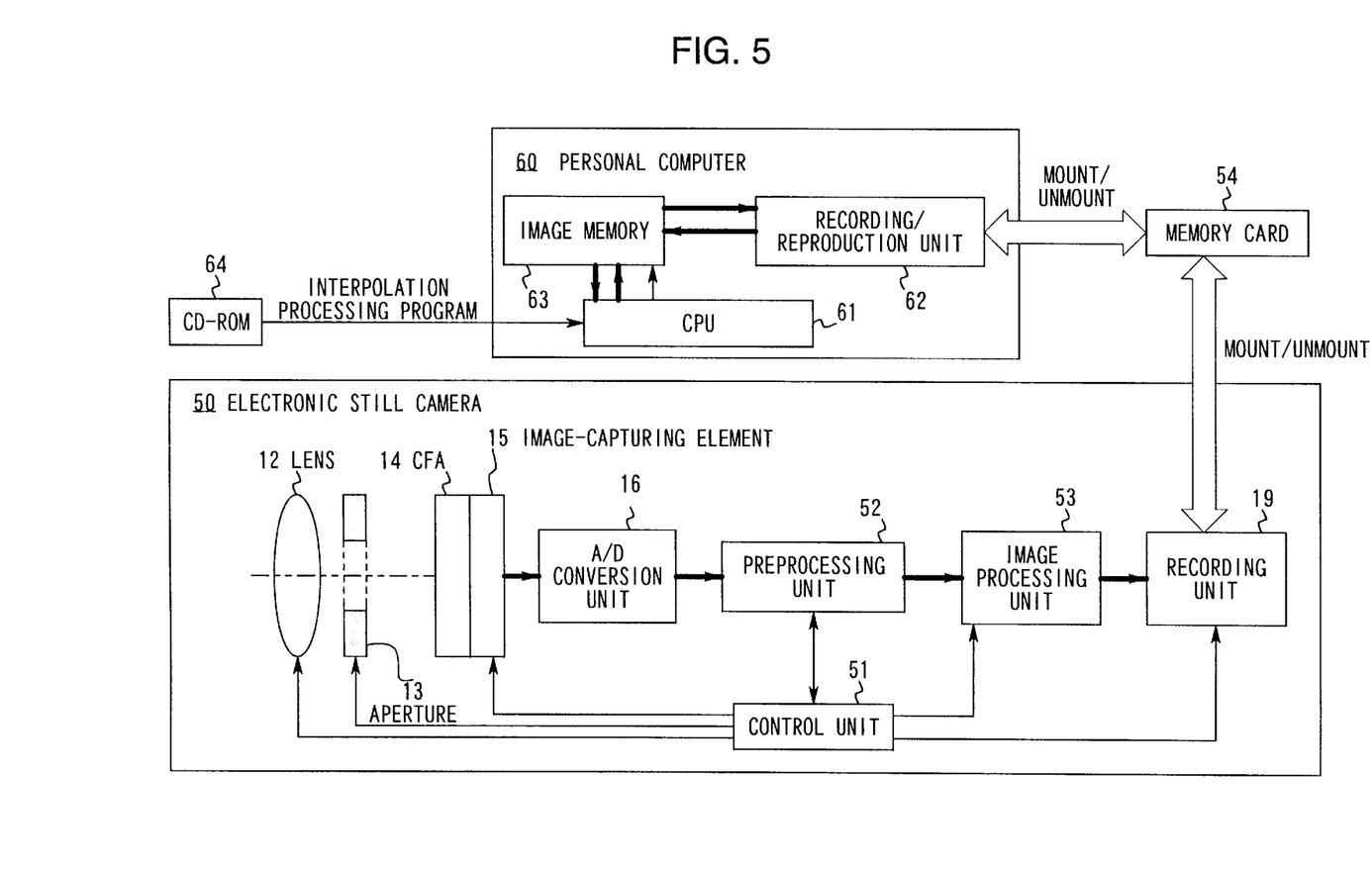
FIG. 5 is a functional block diagram of a third embodiment.

FIG. 5 is a functional block diagram of the third embodiment. It is to be noted that in the third embodiment, a "recording medium having an interpolation processing program recorded therein" is employed to perform interpolation processing with a personal computer.

In FIG. 5, the same reference numbers are assigned to members having the same functions as those in the functional block diagram in FIG. 1 and an explanation of their structural features is omitted.

It is to be noted that an electronic still camera 50 illustrated in FIG. 5 structurally differs from the electronic still camera 10 in FIG. 1 in that a control unit 51, a preprocessing unit 52 and an image processing unit 53 are provided in place of the control unit 11, the preprocessing unit 17 and the image processing unit 18 respectively.

In addition, in FIG. 5, a personal computer 60 is provided with a CPU 61, a recording/reproduction unit 62 and an image memory 63. The CPU 61 is connected to the recording/reproduction unit 62 and the image memory 63. The output of the recording/reproduction unit 62 is connected to the image memory 63, whereas the output of the image memory 63 is connected to the CPU 61 and the recording/reproduction unit 62. In addition, the output of the CPU 61 is connected to the image memory 63.

An interpolation processing program that prompts the CPU 61 to execute processing corresponding to that performed in steps S4~S12 in FIG. 2 and S4~S12 in FIG. 4 by the color composition identification unit 22 and the interpolation processing unit 23 in FIG. 1 is recorded in a CD ROM 64.

In addition, it is assumed that in the third embodiment, such an interpolation processing program is pre-installed in the CPU 61.

It is to be noted that color composition identification processing and interpolation processing are achieved through a "function of identifying the color component composition of image data" and a "function of executing interpolation processing" fulfilled by the CPU 61.

Figure 6A:
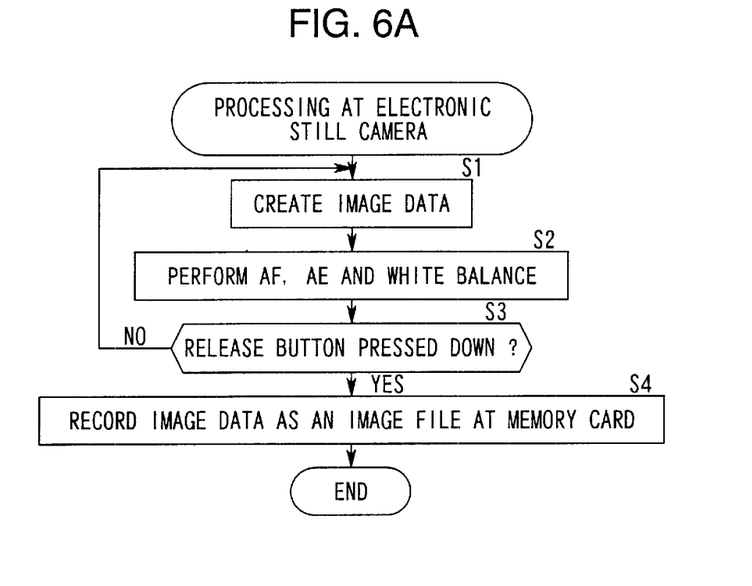
FIG. 6A is an operation flowchart of the third embodiment.
Figure 6B:
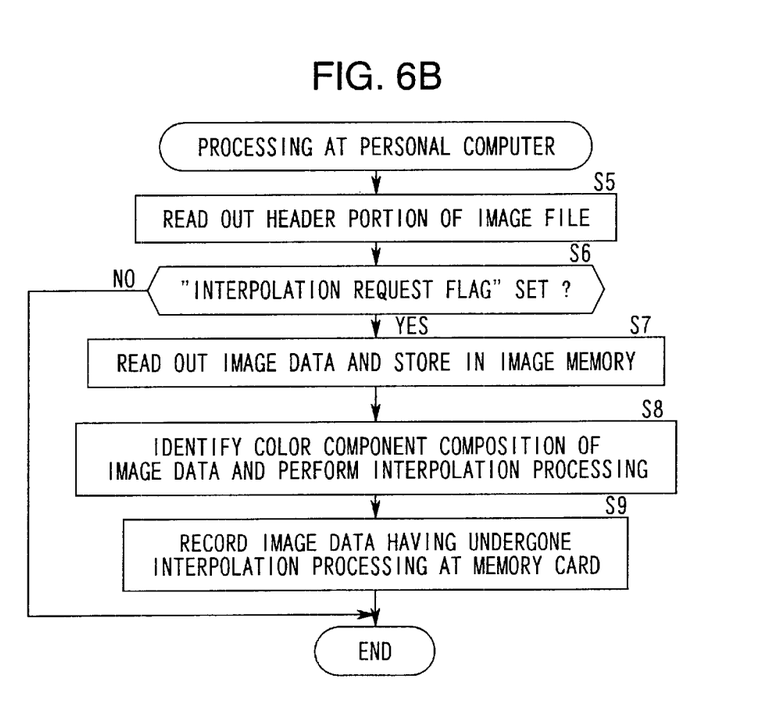
FIG. 6B is an operation flowchart of the third embodiment.

FIG. 6 is an operation flowchart of the third embodiment. The following is an explanation of the operation performed in the third embodiment given in reference to FIGS. 5, 6A and 6B.

First, the operation of the electronic still camera 50 is explained. In a state in which the main power is turned on, an image signal is generated at the image-capturing element 15 as in the first embodiment, and the A/D conversion unit 16 performs A/D conversion for the image signal to generate image data as in the first embodiment (FIG. 6A, S1).

The image data created in this manner are provided to the preprocessing unit 52 where they undergo white balance processing and then are provided to the image processing unit 53. At the preprocessing unit 52, parameters required in AF (auto-focus adjustment), AE (auto-exposure) and white balance processing are determined based upon the image data provided by the A/D conversion unit 16.

The control unit 51 executes AF (auto-focus adjustment) and AE (auto-exposure) via a lens drive unit and an aperture drive unit (not shown) in correspondence to the AF (auto-focus adjustment) and AE (auto-exposure) parameters thus determined and the preprocessing unit 52 performs white balance processing in correspondence to the parameter set for performing the white balance processing (FIG. 6A, S2).

In addition, the control unit 51 makes a decision as to whether or not the shutter release button (not shown) provided at the casing of a electronic still camera 50 has been pressed down (FIG. 6A, S3).

When the control unit 51 ascertains that the shutter release button has been pressed down, it issues an instruction to the image processing unit 53 and the recording unit 19 to record the image data in a memory card 54 (FIG. 6A, S4).

It is to be noted that in this embodiment, the image processing unit 53 directly provides the image data received from the preprocessing unit 52 to the recording unit 19 without performing any image processing on them.

The recording unit 19 records the image data in the memory card 54 in an image file format and sets an "interpolation request flag" that is a flag indicating that image data require interpolation processing and is provided at the header portion of the image file.

Next, the operation of the personal computer 60 is explained. When the memory card 54 with the image file recorded therein is mounted at the personal computer 60, the CPU 61 reads out the header portion of the image file via the recording/reproduction unit 62 (FIG. 6B, S5).

After reading out the header portion of the image file in this manner, the CPU 61 makes a decision as to whether or not the "interpolation request flag" is set (FIG. 6B, S6). Only when it is obtained that the "interpolation request flag" is set through such decision-making, does the CPU 61 read out the image data in the memory card 54 via the recording/reproduction unit 62 and store them in the image memory 63 (FIG. 6B, S7).

In addition, by executing the interpolation processing program described above, the CPU 61 performs the "processing for identifying the color component composition" and the "interpolation processing" on the image data in the image memory 63 (FIG. 6B, S8).

In other words, the CPU 61 performs processing corresponding to that performed in steps S4~S12 in FIG. 2 and steps S4~S12 in FIG. 4 by the color composition identification unit 22 and the interpolation processing unit 23 in FIG. 1.

When this processing is completed, the CPU 61 again records the image data that have undergone interpolation processing in the memory card 54 via the recording/reproduction unit 62 (FIG. 6B, S9). It is to be noted that the operator may use an input device (e.g., a keyboard) of the personal computer 60 to make a selection as to whether or not the image data having undergone interpolation processing are to be recorded in the memory card 54.

As explained above, in the third embodiment, interpolation processing similar to that achieved in the first embodiment or the second embodiment can be executed using the personal computer 60. Thus, in the third embodiment, interpolation processing can be performed quickly and accurately as in the first embodiment and the second embodiment.

It is to be noted that while the image data to undergo the interpolation processing are obtained by the personal computer 60 via the memory card 54 in this embodiment, any other method may be adopted in regard to the acquisition of image data. For instance, when adopting the present invention in a personal computer provided with a communication means, interpolation processing may be performed on image data provided via the communication means.

While the explanation has been given using electronic cameras as examples in reference to the embodiments above, the present invention is not limited to them. For instance, it may be adopted in a video camera having a still picture photographing function, and a mobile information apparatus or a notebook personal computer provided with a CCD camera or the like. Furthermore, it may be adopted when capturing a dynamic image using a video camera or the like. In other words, the present invention may be adopted in all types of apparatuses that are capable of obtaining color images expressed through a colorimetric system constituted of a plurality of color components.

What is claimed is:

1. An interpolation processing apparatus comprising:
   an interpolation processing unit that performs interpolation processing on a color image expressed through a colorimetric system constituted of a predetermined plurality of color components to determine an interpolation quantity corresponding to a value representing a missing color component in each pixel; and
   a color composition identification unit that identifies a color component composition of the color image, said color component composition representing hue information of the color image, wherein:
   said interpolation processing unit is capable of performing a plurality of types of interpolation processing in correspondence to color component compositions of the color image, selects a type of interpolation processing corresponding to the color component composition identified by said color composition identification unit and performs the type of interpolation processing that has been selected on the color image.

2. An interpolation processing apparatus according to claim 1, wherein:
   when said interpolation processing unit decides that the color image is a single-hue image based upon the color component composition identified by said color composition identification unit, said interpolation processing unit selects an interpolation processing that uses a value corresponding to a value of a color component of a pixel to undergo interpolation processing as an interpolation quantity for another color component in the pixel.

3. An interpolation processing apparatus according to claim 1, wherein:
   when said interpolation processing unit decides that the color image is a single-hue image based upon the color component composition identified by said color composition identification unit, said interpolation processing unit selects an interpolation processing in which weighting factor as to a value of a color component of a pixel to undergo interpolation processing is increased and weighted addition is performed for the value of the color component in the pixel and a value of a color component of a pixel located near said pixel to determine an interpolation quantity for another color component in said pixel.

4. An interpolation processing apparatus according to claim 2, wherein:
said color composition identification unit divides the color image into a plurality of areas and identifies a color component composition for each area by calculating color averages each of which indicates an average value per pixel for one of the color components within each area and calculating differences among the color averages of the color components; and
said interpolation processing unit decides that the color image is a single-hue image when the differences among the color averages of the color components in all the areas are within predetermined ranges respectively.

5. An interpolation processing apparatus according to claim 2, wherein:
said color composition identification unit divides the color image into a plurality of areas and identifies a color component composition for each area by calculating color averages each of which indicates an average value per pixel for one of the color components within each area and calculating ratios among the color averages of the color components; and
said interpolation processing unit decides that the color image is a single-hue image when the ratios among the color averages of the color components in all the areas are within predetermined ranges respectively.

6. An interpolation processing apparatus according to claim 4, wherein:
differences among color averages of the color components in a specific area among said plurality of areas are used as reference values and said predetermined ranges are set centered around said reference values.

7. An interpolation processing apparatus according to claim 5, wherein:
ratios among color averages of the color components in a specific area among said plurality of areas are used as reference values and said predetermined ranges are set centered around said reference values.

8. An interpolation processing apparatus according to claim 3, wherein:
said color composition identification unit divides the color image into a plurality of areas and identifies a color component composition for each area by calculating color averages each of which indicates an average value per pixel for one of the color components within each area and calculating differences among the color averages of the color components; and
said interpolation processing unit decides that the color image is a single-hue image when the differences among the color averages of the color components in all the areas are within predetermined ranges respectively.

9. An interpolation processing apparatus according to claim 3, wherein:
said color composition identification unit divides the color image into a plurality of areas and identifies a color component composition for each area by calculating color averages each of which indicates an average value per pixel for one of the color components within each area and calculating ratios among the color averages of the color components; and
said interpolation processing unit decides that the color image is a single-hue image when the ratios among the color averages of the color components in all the areas are within predetermined ranges respectively.

10. An interpolation processing apparatus according to claim 8, wherein:
differences among color averages of the color components in a specific area among said plurality of areas are used as reference values and said predetermined ranges are set centered around said reference values.

11. An interpolation processing apparatus according to claim 9, wherein:
ratios among color averages of the color components in a specific area among said plurality of areas are used as reference values and said predetermined ranges are set centered around said reference values.

12. An interpolation processing apparatus according to claim 1, wherein:
when said interpolation processing unit decides that the color image is a gray image based upon the color component composition identified by said color composition identification unit, said interpolation processing unit selects an interpolation processing that uses a value corresponding a value of a color component of a pixel to undergo interpolation processing as interpolation quantity for another color component in the pixel.

13. An interpolation processing apparatus according to claim 12, wherein:
said color composition identification unit divides the color image into a plurality of areas and identifies a color component composition for each area by-calculating color averages each of which indicates an average value per pixel for one of the color components within each area and calculating differences among the color averages of the color components; and
said interpolation processing unit decides that the color image is a gray image when the differences among the color averages of the color components in all the areas are within predetermined ranges respectively.

14. An interpolation processing apparatus according to claim 12, wherein:
said color composition identification unit divides the color image into a plurality of areas and identifies a color component composition for each area by calculating color averages each of which indicates an average value per pixel for one of the color components within each area and calculating ratios among the color averages of the color components; and
said interpolation processing unit decides that the color image is a gray image when the ratios among the color averages of the color components in all the areas are within predetermined ranges respectively.

15. An interpolation processing apparatus according to claim 14, wherein:
said predetermined ranges are centered around a value 1.

16. A recording medium that records an interpolation processing program to be executed by a computer, said interpolation program comprising:
a procedure in which a color component composition of a color image expressed through a colorimetric system constituted of a predetermined plurality of color components are identified, said color component composition representing hue information of the color image;
a procedure in which one type of interpolation processing that corresponds to the color component composition that has been identified is selected from a plurality of types of interpolation processing corresponding to color component compositions of the color image; and a procedure in which the interpolation processing that has been selected is executed and an interpolation quantity corresponding to a value of a color component missing in each pixel is determined for the color image.

17. An electronic camera comprising:

an image-capturing device that has a plurality of pixels and generates an image by capturing an image of a subject;

color filters that are provided in correspondence to a plurality of pixels of said image-capturing device and are constituted by adopting a colorimetric system constituted of a plurality of color components;

an interpolation processing device that performs interpolation processing on a color image generated by said color filters and said image-capturing device to determine an interpolation quantity corresponding to a value of a missing color component in each pixel; and a color composition identification device that identifies a color component composition of the color image, said color component composition representing hue information of the color image, wherein:

said interpolation processing device is capable of performing a plurality of types of interpolation processing in correspondence to color component compositions of the color image, selects a type of interpolation processing that corresponds to the color component composition identified by said color composition identification device and performs the type of interpolation processing that has been selected on the color image.

18. An electronic camera according to claim 17, wherein:

when said interpolation processing device decides that the color image is either one of a single-hue image and a gray image based upon the color component composition identified by said color composition identification device, said interpolation processing device selects an interpolation processing that uses a value corresponding a value of a color component of a pixel to undergo interpolation processing as an interpolation quantity for another color component in the pixel.

19. An interpolation processing apparatus comprising:

an interpolation processing unit that performs interpolation processing on a color image expressed through a colorimetric system constituted of a predetermined plurality of color components to determine an interpolation quantity corresponding to a value representing a missing color component in each pixel; and a color composition identification unit that identifies a color component composition of the color image, said color component composition representing one of at least a single-hue image, a color image other than the single-hue image, a gray image and a color image other than the gray image, wherein:

said interpolation processing unit is capable of performing a plurality of types of interpolation processing in correspondence to color component compositions of the color image, selects a type of interpolation processing corresponding to the color component composition identified by said color composition identification unit and performs the type of interpolation processing that has been selected on the color image.

20. An interpolation processing apparatus according to claim 3, wherein said weighting factor is set to be larger than ½.

* * * * *